April 5, 1960
K. R. WENDT ET AL
2,931,217
ELECTRONIC TIMING APPARATUS
Filed Oct. 27, 1955
3 Sheets-Sheet 1
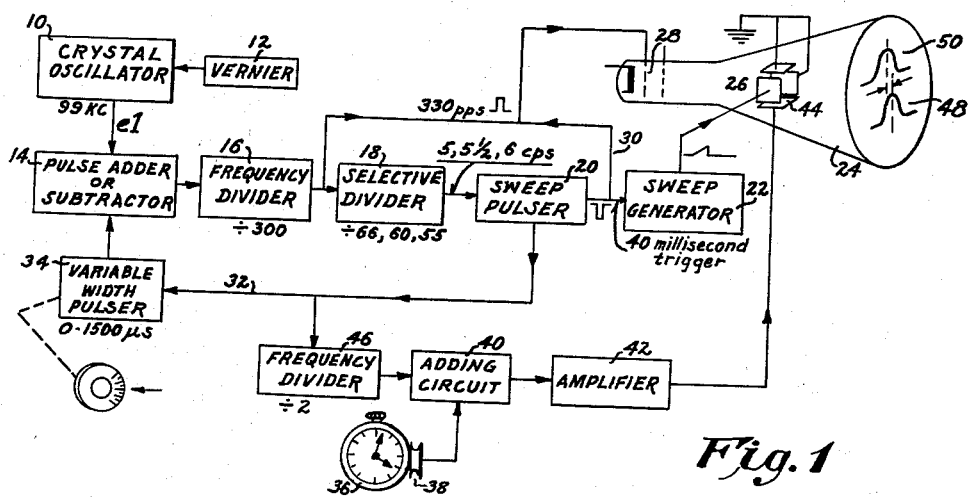
Fig.1
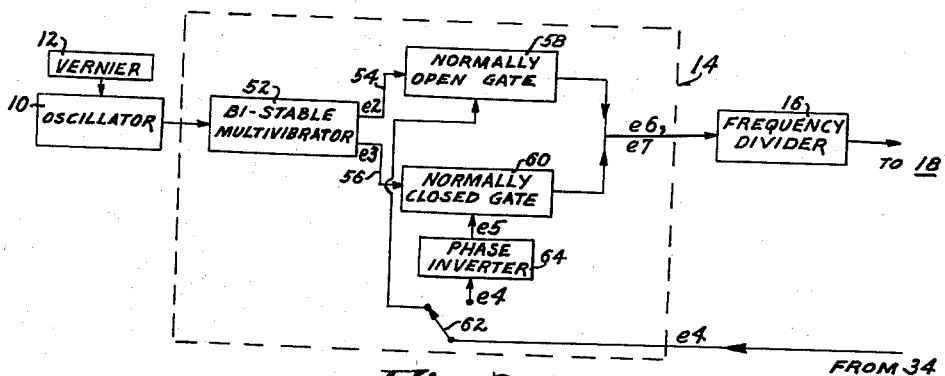
Fig.2
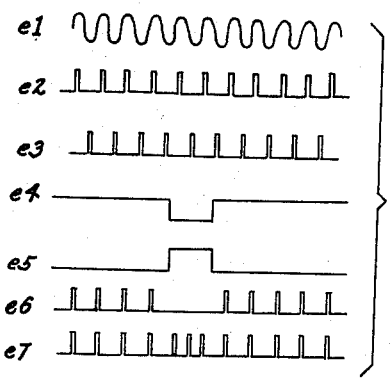
Fig.3
| WATCH BEAT → | 5 | 5½ | 6 |
|---|---|---|---|
| SCAN RATE cycles/sec. | 5±.038 | 5.5±.046 | 6±.055 |
| WATCH ERROR sec./day | 0-650 | 0-720 | 0-785 |
Fig.4
INVENTORS
Karl R. Wendt and
William K. Squires,
BY Bean, Brooks, Buckley & Bean,
ATTORNEYS April 5, 1960  K. R. WENDT ET AL  2,931,217
ELECTRONIC TIMING APPARATUS
Filed Oct. 27, 1955  3 Sheets-Sheet 3

INVENTORS:
Karl R. Wendt and
William K. Squires,

BY Bean, Brooks, Buckley & Bean,
ATTORNEYS

United States Patent Office 2,931,217
Patented Apr. 5, 1960

2,931,217
ELECTRONIC TIMING APPARATUS

Karl R. Wendt, Eggertsville, and William K. Squires, Snyder, N.Y., assignors, by mesne assignments, of forty percent to William K. Squires, Woodland Hills, Calif., and forty percent to Karl R. Wendt, Littleton, Colo., and twenty percent to Alfonso C. Bellanca, Los Angeles, Calif.

Application October 27, 1955, Serial No. 543,163

14 Claims. (Cl. 73—6)

This invention pertains to timing apparatus, and particularly to such apparatus using electronic circuitry and techniques to obtain high precision in the time scale, as well as a convenient and useful display of the relationship between an accurately produced time scale and a series of events which it is desired to bring into agreement with such time scale.

More specifically, the invention is concerned with timing apparatus for measuring and displaying the timing characteristics of a watch, clock or the like, in such a way as to permit the operator to obtain a rapid and complete analysis of rate errors and other anomalies in the operation of the timepiece, usually with a view to their correction. The invention will be described in connection with this preferred application because such a specific description will render the principles of the invention more readily understood. However, it will be apparent to those skilled in the art that these same principles may be applied to other timing problems, especially those involving the timing of a repeated series of events whose occurrence may be sensed by electrical means.

It is recognized that electronic principles, such as the use of accurate oscillators and the like, have been proposed many times for the accomplishment of timing functions, and even specifically for the determination and display of errors in watches and the like. However, all such proposals of which we are aware have concerned themselves with the problem of the generation of a frequency of high accuracy, so that when it is compared with the frequency of watch beats, for example, any difference can be detected in a reasonably short interval. The general approach has been to overcome the problem of the sensing of small errors by the use of increased precision in the standard time scale produced electrically. The importance of this phase of the problem is of course well recognized, and may be realized more fully by considering that the detection of an error in a timepiece as small as a few seconds a day, by the classical method of observing the indicated time against a standard chronometer, requires at least several hours of observation time in order that the extremely small instantaneous error may accumulate to the point where it can be observed and corrected. This observation time is of course multiplied when it is necessary or desired to obtain an indication of the errors in the timepiece in each of several positions of orientation thereof, as required, for example, in the testing of watches for standard certificates. Even for the relatively less precise adjustment of watches for commercial purposes, both the classical method of chronometric comparison, and the known electronic systems utilizing precision frequency sources, require considerable observation times.

The present invention overcomes these objections to the prior methods not simply by increasing the precision of the generated comparison frequency, but by further improvements which give a direct and almost immediate indication of the direction or sense of the timepiece error, and in a form which enables the magnitude of said error to be estimated very closely. Basically, this aspect of the invention involves the controlled alteration of the apparent standard frequency derived from the precision generator, by amounts calculated to yield the maximum amount of information regarding the timepiece error in the shortest possible observation period. Thus, the invention comprehends a method of altering the effective frequency as derived from the standard generator, by accurately controllable amounts of considerably greater magnitude than is normally possible merely by altering the fundamental frequency of the precision generator.

A further object of the invention is to provide for the display of the comparative information (timepiece rate against standard time scale) in such a way as to yield additional information of value to the technician who wishes to adjust the timepiece to reduce this difference to a minimum value. In conventional timepieces, alternate "beats" are produced at the opposite ends of the swing of the escapement pallet. Referring to these alternating beats as "ticks" and "tocks," it is apparent that even in an accurately adjusted timepiece, imperfections or maladjustments of the pallet, anchor or other parts may result in asymmetry; thus, the time interval between a tick and a tock may be different from that between a tock and a tick. This is a condition which should be corrected if the timepiece is to function dependably over long periods and under different conditions of use or orientation.

An additional object of the invention is to provide a system of the above general type in which the final information displayed to the observer is limited to that which is directly useful in the desired determinations. That is, since the period occupied by the actual generation of a tick or a tock is a rather small part of the total time between these impulses, significant information can be derived electrically only for this fractional period. The invention displays only the significant portion of the information, and this permits a scale to be used which is much more indicative of the condition of the timepiece than if the entire tick-tock cycle were displayed to the observer.

Still another important object of the invention is to provide for adjusting the sweep repetition rate to agree with the rate of a timepiece. In particular, means are provided such that the error in the reading of a rate dial controlling the sweep rate decreases for watches whose errors approach zero. Thus, the calibration-establishing means may be relatively simple because errors of any magnitude in the calibration will only arise in connection with the testing of a timepiece having a rather gross chronometric error. As the timepiece is adjusted nearer and nearer to an ideal condition, the error inherent in the rate control or dial reading is automatically reduced until such error vanishes in the case of a perfectly isochronous timepiece.

Another object of the invention is to provide for markers incorporated in the display which will always be standing still and always separated from one another by a distance corresponding to a precise time interval. These markers serve to measure portions (and the whole) of the watch trace to aid in judging alignment between the tick and tock, and as an additional measure of slow drifts in rate.

A further object of the invention is to provide apparatus of the above type which is adapted for use with timepieces (or other time-series devices) having distinct repetition rates or beats per second. In the case of watches, for example, escapement trains utilizing 5, 5½ and 6 beats per second are common. While it would be possible to provide for these different types by utilizing a corresponding number of precision frequency generators, or by a single generator and a plurality of frequency divider systems, any calibration marks utilized could be correct for only one of the types of timepieces. The present invention provides novel means for deriving information as to timepieces having different number of beats per second, without disturbing the precision of the calibration markers, and of such kind that the apparatus may be properly adjusted for the desired beat by manipulation of a single selector control.

The above and other objects and advantages of the invention will best be understood by referring now to the following detailed specification of a preferred embodiment thereof, given by way of example, and taken in connection with the appended drawings, in which:

Fig. 1 is a block diagram of a complete timing apparatus and system of preferred form.

Fig. 2 is also a block diagram giving more detail as to a novel portion of the Fig. 1 arrangement.

Fig. 3 is a graphical representation of a series of waves or pulse trains which will aid in understanding the invention.

Fig. 4 is a tabulation giving the values of certain parameters of the system for use with watches having different numbers of beats per second.

General description

Figure 5:
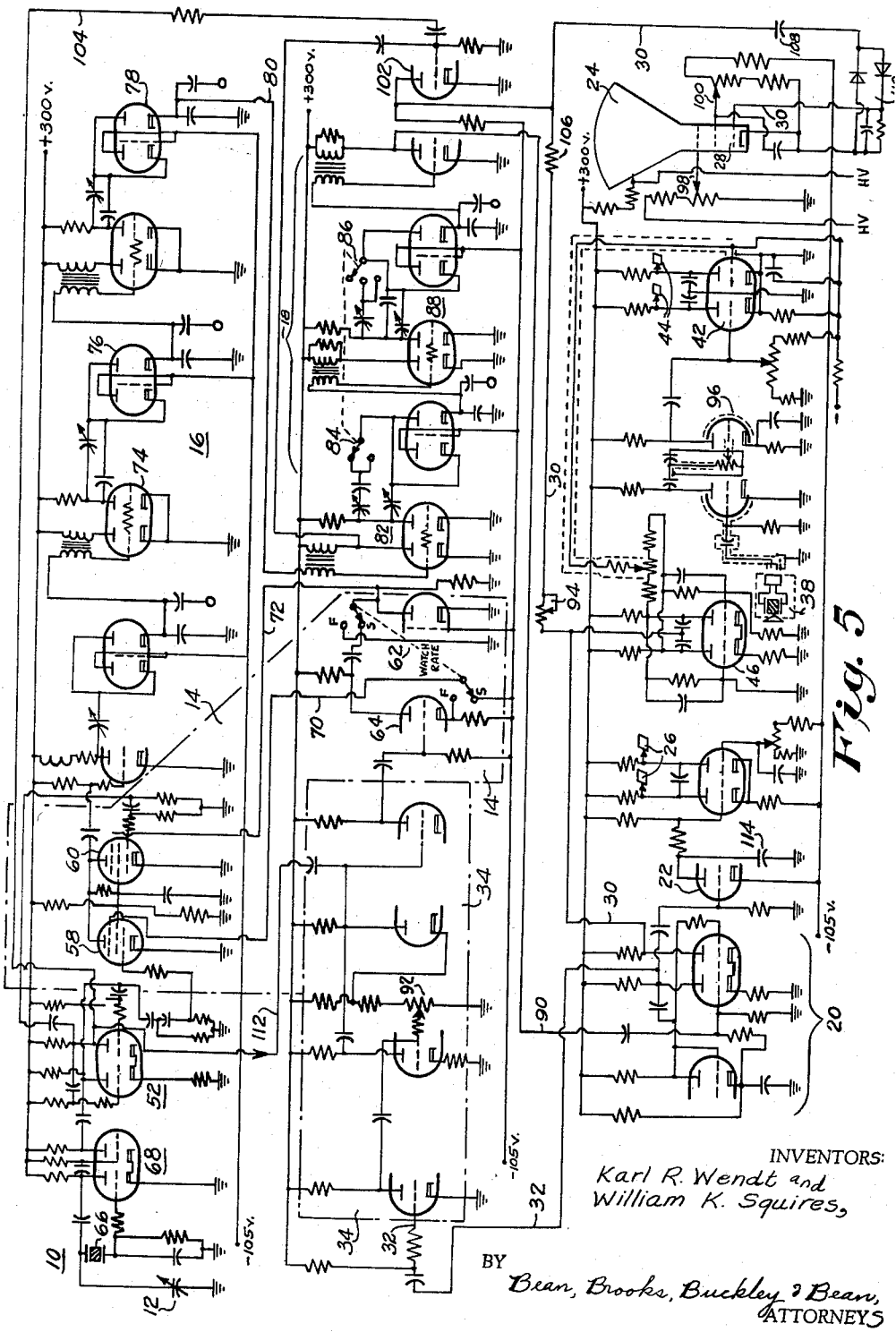
Fig. 5 is a schematic wiring diagram of a complete embodiment of the invention.

The timing system of the invention utilizes as the source of its precision time scale an accurate oscillator or generator indicated in Fig. 1 by the reference number 10. This oscillator may be of the crystal-controlled type or the magnetostrictive type, or may be any other electric generator or standard frequency source capable of the necessary precision in frequency. Such an oscillator necessarily produces output frequencies very much higher than can be used for direct comparison with watches having beat rates of only a few per second, and it is common in the timing art to provide frequency division means to derive from the oscillator 10 a much lower frequency, but one of precision comparable to the precision of the master oscillator. The present invention does not provide for the immediate frequency division of the output of oscillator 10, and instead accomplishes this division procedure after the effective frequency derived from the oscillator has been altered in a special way to be described below. Numeral 12 designates a vernier connected to or forming a part of oscillator 10, by which its natural frequency of oscillation may be adjusted a minor amount to conform exactly to any available primary standard of frequency. Thus, the vernier may be adjusted to minimize the error between the frequency output of oscillator 10 as compared against a standard frequency broadcast, standard time signals, or a laboratory source of adequate precision. However, the degree to which the frequency of an electronic source such as oscillator 10 can be adjusted is wholly inadequate to accomplish the frequency changes necessary to permit direct comparison with timepieces having normal rate errors as encountered in commercial practice. For example, a crystal-control oscillator can be varied in frequency by a few cycles per second by adjusting the capacitance in series with or in shunt to the crystal itself, and by other ways familiar to those experienced with such oscillators, but such deviations are not sufficient to match errors in watch rates even as low as several seconds per day. Moreover, it would not be desirable to adjust the frequency of the oscillator 10 during the use of the instrument, because to do so would involve a loss of its calibration standard.

For a reason which will appear, the natural frequency of oscillator 10 is chosen at 99 kilocycles per second, which is a frequency readily obtainable from such equipment in simple form. In order to provide a suitable range of variation in the effective output frequency, apparatus designated generally by reference numeral 14 is provided, the same permitting the selective addition or subtraction of pulses to the train of pulses derived from the oscillator 10. In this connection, it may be stated that if the output of oscillator 10 is, as conventional for such devices, a sinusoidal voltage wave, the equipment 14 first converts this output wave to a series of narrow pulses of fixed polarity; for instance, a single narrow positive-going pulse for each positive half cycle of the sine wave produced by oscillator 10. It is these pulses which control the timing characteristics of the remaining circuitry, and device 14 enables additional pulses to be inserted periodically in the train, to raise the apparent or effective pulse frequency at the output of the device 14; it also permits the selective elimination of certain of the pulses derived from oscillator 10, to permit a reduction in the apparent output frequency.

The pulses of master oscillator frequency, or as modified in frequency as just described, are then passed to a frequency dividing circuit 16 which effects a division of the frequency by a factor of 300 in the embodiment here being described. In the case in which no pulses are added or subtracted by the apparatus 14, the input to frequency divider 16 will consist of 99,000 pulses per second, and its output will therefore be 330 pulses per second. A portion of this output passes then into a second frequency divider 18 which is adjustable to effect division by a further factor which may be either 66, 60 or 55, to provide an output of 5, 5½ or 6 pulses per second as indicated. These frequencies as stated are also for the normal or unmodified frequency of precisely 99 kilocycles from oscillator 10, and of course will be slightly different if pulses are added or subtracted due to the operation of device 14. From divider 18 the pulses just described pass to a sweep pulser 20 whose function is to produce a 40 millisecond sweep pulse for each of the input pulses; e.g., 5, 5½ or 6 times per second. This 40 millisecond sweep pulse is applied to the sweep generator 22 to cause the latter to supply a linearly rising voltage wave to the horizontal deflecting electrodes 26 of the cathode ray tube 24, for the duration of each 40 millisecond pulse.

The reason for utilizing a sweep pulse having a width of only 40 milliseconds for each sweep cycle is that it is desired to display only the information derived from the tick and tock sensing means in the region of occurrence of these beats. Since at 5 or 6 beats per second the total beat interval is of the order of 200 milliseconds, the use of the narrower 40 millisecond pulses to control sweep oscillator 22 produces sweep display only during the significant intervals, and permits a larger horizontal scale of display to be utilized.

From frequency divider 16, another portion of its output (nominal 330 pulses per second) is applied to the intensity control electrode 28 of tube 24. The circuit constants are adjusted so that the intensity of the cathode ray beam is relatively high except when a pulse from divider 16 reaches electrode 28, when the trace is momentarily darkened to produce a trace constituting a series of dark dots spaced as determined by the pulse frequency output of divider 16. Since both the sweep oscillator 22 and the intensity control electrode 28 are governed by the output of divider 16, both of these will partake of the minor frequency variations introduced by the pulse adder and subtractor 14; however, these minor variations are accomplished during the period preceding display. That is, the variations introduced by the pulse adder and subtractor 14 all take place and are complete before the first dot shows in the deflection. Hence, during the rest of the sweep, the dots are an exact submultiple of the crystal, and therefore accurately 3.0303 milliseconds apart. Actually, when the rate dial is rotated, the dots all move with respect to the start of scan. The extreme motion is one whole dot, since ±150 pulses at 10.1 microseconds happens to be exactly 3.0303 milliseconds. This will be true regardless of the setting of selective divider 18 to produce 5, 5½ or 6 pulses per second at its output. The reason for selecting 150 as the number of pulses which may be added or subtracted is that this number provides a useful adjustment range from about 4⅓ seconds per day to about 650 seconds per day, fast or slow, as will be explained below under the heading "Frequency Varying System." This is because the frequency of 330 pulses per second is a common multiple of 5, 5½ and 6, and is an integral submultiple of the master frequency of 99 kilocycles. The reason for the choice of the fundamental frequency of 99 kc. is now apparent, since it permits a stationary trace pattern, and stationary calibration dots, for all values of the selective frequency division.

A portion of the pulse output of pulser 20 is also applied, as indicated at connection 30, to the intensity control electrode 28. Its amplitude and polarity are so chosen as to suppress the bright trace except during the 40 millisecond sweep period. This feature prevents blurring of the trace at either of its ends which would otherwise result from the rather lengthy exposure of the screen phosphor at these points during the interval between horizontal sweeps.

In order to control the number of pulses which are added to or subtracted from the master series produced by oscillator 10, the pulse adding and subtracting device 14 is energized for a selected portion of each complete sweep cycle. Conveniently, this timed energization is obtained by deriving from the sweep pulser 20 an output over connection 32 in the form of one pulse for each sweep cycle. This output is applied to the variable width pulser 34, which is triggered by the leading edge of the 40 millisecond pulse from 20, and provides at its output a square pulse of variable time duration. The output of variable width pulser 34 is then applied to device 14 to regulate how many pulses are added to or removed from the original series derived from oscillator 10 to establish the average pulse repetition frequency emitted by the device 14 to the divider 16. The details of this part of the operation will be described more fully below.

The information derived from a timepiece being tested, designated in Fig. 1 by numeral 36, may be obtained from any known or convenient microphone, vibration pickup or other transducer designated 38. The electrical output of this transducer is transmitted through an addition circuit 40 and amplifier 42 to the vertical deflection electrode 44 (or deflecting coil circuit) of tube 24. As shown, it is applied to one vertical deflection plate 44, one plate of each pair being shown as grounded to complete the deflecting circuit. Push-pull circuitry is preferably used in actual practice as described hereinafter. The other input to addition circuit 40 is derived from sweep pulser 20, and may conveniently be a portion of the pulse energy furnished over connection 32 to the variable width pulser 34. This portion of such energy is applied to a frequency divider 46 which effects a frequency division by the factor 2, and applies the resulting pulses to the adding circuit 40. When there is no voltage output from divider 46, information from transducer 38 affects the vertical deflection system of the tube 24 to produce on its face a display indicated for example by numeral 48, and the circuit is adjusted so that this display is not centered on the screen, but is displaced, for example to a below-center position. Since frequency divider 46 has a division factor of 2, it may be thought of as a device for passing only alternate pulses derived from sweep pulser 20. It follows that on alternate sweeps, the output of adding circuit 40 will be increased by the fixed height of the pulse derived from divider 46, and operates to increase the vertical deflection voltage so that every other beat will be displayed as indicated at numeral 50 in a higher position upon the screen of tube 24. In this way, the alternate ticks and tocks are displayed separately, and the circuitry is so designed that they will lie on the same vertical center line when the ticks and tocks occur at equal intervals from one another. Any deviation in the equal spacing of these events will be evidenced by a lateral shift of the vertical center lines of the two displays, as indicated by small arrows on the tube face in Fig. 4, and the degree of deviation may easily be estimated because of the dot structure of the two displays.

*Frequency varying system*

The manner in which apparatus 14 operates to provide a small but substantial change in the effective frequency of oscillator 10 will now be described in more detail with reference to Figs. 2 and 3. Referring first to Fig. 3, the normal sine wave voltage output of oscillator 10 is indicated at $e1$, and this output is converted to a series of narrow pulses $e2$ which will therefore have the same timing precision as source 10. Such pulses $e2$ may, for example, be readily obtained by applying the output of oscillator 10 to the multivibrator 52 which may form a part of the entire device 14, as shown in Fig. 2. The multivibrator 52 is of the bi-stable type, arranged to produce the series of pulses $e2$ of Fig. 3 at one output terminal or lead such as 54, and a second set of pulses $e3$ from another output lead 56. These pulse series are identical in amplitude and are both synchronous with the master wave $e1$, but the multivibrator 52 is arranged so that in point of time the pulses $e3$ fall half-way between successive pulses $e2$. In other words, series $e3$ is identical with $e2$ but shifted in phase by one-half of the pulse repetition interval; the pulses $e2$ may be thought of as lining up with and produced by the positive excursions of $e1$, and the pulses $e3$ line up with and are produced by the negative excursions of $e1$. As shown in Fig. 2, one set of pulses $e2$ is applied to a first gate circuit 58, and the other set of pulses is applied to a second gate circuit 60. Gate 58 is to be thought of as normally open or conductive, so that pulses $e2$ are transmitted unchanged to the frequency divider 16. When gate 58 is closed, however, as by applying thereto a negative square pulse $e4$ of selected length, the output of gate 58 will omit a number of the pulses $e2$ determined by the width of the gating pulse $e4$. As shown, this gating pulse is fed to gate 58 from a manual selector switch 62 which directs the gating pulse to gate 58 from the variable width pulser 34 of Fig. 1. When switch 62 is thrown to its other position, the variable width pulse $e4$ will pass to a phase inverter 64 and thence to gate 60, to open this latter gate (which is normally closed) so that a certain number of the pulses of series $e3$ will be transmitted through gate 60 and added to (interspersed with the pulses of) the output of gate 58. The shapes of the $e4$ pulse going to gate 58 and the $e5$ pulse going to gate 60 are shown in Fig. 3. However, by other gating arrangements, gates 58 and 60 may of course be operated in the manner described by other forms of control pulses. Thus, it would be obvious to omit phase inverter 64 and design gate 60 so as to be opened by a pulse of the same polarity which closes gate 58.

With switch 62 in the position shown, the arrival of an $e4$ pulse at gate 58 will eliminate or subtract a few $e2$ pulses during each sweep period from the pulse train passing to divider 16, this condition being indicated in Fig. 3 by the train $e6$, the same representing the series $e2$ after the elimination of two pulses by the gating wave $e4$. When switch 62 is thrown to its other position, a few pulses of the $e3$ series will be added to the $e2$ series, producing the result indicated by train $e7$ because of the operation of gating pulse $e5$ to open gate 60 and intersperse one or more (as shown, one) of the $e3$ pulses in the $e2$ series.

It has been found that changing the effective frequency of output of oscillator 10 in this manner permits a frequency shift much greater than can be accomplished by any practical vernier 12. While it might be thought that the pulse trains $e6$ and $e7$ would be objectionable because of the fact that the pulses are abnormally crowded during a portion of each sweep, the fact that this action is followed by a substantial frequency division in divider 18 results in an output to sweep pulser 20 which is indistinguishable from a regular pulse cadence. No objection arises even as to the 330 pulse-per-second output to the intensity electrode 28, because the frequency change is restricted to periods when display is not accomplished.

The length of gating pulses $e4$ and $e5$ is conveniently variable from zero to 1500 microseconds. In the embodiment shown, of course, a single control on the length of $e4$ is all that is required. At the scan rate of 5 beats per second, the total beat interval is 200,000 microseconds. This maximum $e4$ pulse length of 1500 microseconds thus permits up to 150 individual pulses to be gated out of the series $e2$, and up to 150 extra pulses of the $e3$ series to be inserted, because at 99 kc. each pulse period represents approximately 10 microseconds. An increment of one pulse added or deleted represents about .00025 cycle per second change in the master frequency (in the case of 5 beats per second), corresponding to about 4⅓ seconds per day in the timepiece rate. It should be borne in mind that the only timing inaccuracy possible in this system assuming an adequate oscillator 10 is an error in the width of the gating pulse $e4$ or $e5$. Since each step in the rate shift amounts to about 4⅓ second per day, 150 such steps represents a variation of about 650 seconds per day in each of the fast and slow directions, a rate variation which is adequate to obtain stationary displays even for timepieces having gross rate errors. If the error in the width of pulse $e4$ and $e5$ is kept within 5%, the result would be at most an uncertainty of about 33 seconds per day in the case of estimating the maximum error of 650 seconds per day. Where the timepiece being measured is of greater accuracy than this, the uncertainty will decrease, and will of course become zero for the ideal condition, because no pulse $e4$ or $e5$ will then be required; i.e., the $e4$ pulse will be of zero width.

The adjustment for pulse width at the output of variable width pulser 34 is made by a calibrated dial, so that when a stationary display is obtained on tube 24, the dial setting indicates the timepiece error, and the position of switch 62 indicates whether it is fast or slow. When the watch is regulated nearly to perfection, rate errors of smaller magnitude than that corresponding to one step (addition or subtraction of a single pulse $e3$ or $e2$) may be estimated by the rate of drift of the display pattern across the tube face, in terms of the calibration dots making up the trace.

The chart in Fig. 4 gives typical values of the range of scan rates available with the above described system for timepieces having beats of 5, 5½ and 6 per second; it also indicates the maximum error in a timepiece being inspected which can be measured using a maximum width of 1500 microseconds for the pulses $e4$ and $e5$. These are convenient values for commercial purposes, but are of course not to be construed as limiting the invention to such figures.

Fig. 5 of the drawings is a detailed schematic of the embodiment described above, sufficient to enable one skilled in electronic circuitry to make and use the invention. Since the wiring details of the individual portions or components of this circuit are known in and of themselves or for other applications, actual circuit constants are considered unnecessary. Such details can be obtained from standard texts on circuit design. To enable the diagram to be followed, a general description of the purpose of each major part will now be given.

Description of circuitry

In Fig. 5, ordinary direct current and voltage supplies for anode circuits, bias sources, cathode heaters and acceleration voltages (for the cathode ray tube) have been omitted for reasons of simplification. Typical supply voltage values are given, however. Also, numerals of reference for parts already mentioned above are employed to indicate those same parts in Fig. 3. Thus, numeral 10 designates the master oscillator employing crystal 66 as its frequency controlling element. The crystal frequency output is amplified as at 68 and the output ($e1$ of Fig. 3) is applied to the multivibrator 52 of adder/subtractor 14.

The open and closed gates are indicated by 58 and 60, each comprising a pentode gate, the former controlled from manual switch 62 over lead 70 and the latter over lead 72. The frequency divider indicated as a whole by 16 may conveniently comprise a first stage 74 dividing by five, a second stage 76 dividing by ten, and a final stage 78 dividing by six to give a total divisor of 300. The divided output (nominal 330 pulses per second) appears on lead 80 and passes to the selective divider 18 comprising two stages. Stage 82 accomplishes division by eleven or twelve as selected by switch 84, and this switch is ganged to another switch 86 setting stage 88 to divide by six or five. The switches are 3-position types connected as shown to give a net selection of division factor as among 66, 60 or 55 (6×11, 5×12 or 5×11). The output, of 5, 5½ or 6 pulses per second, is applied to sweep (and blanking) pulser 20 over lead 90, and lead 32 extends a portion thereof to variable-width pulser 34 controlling adder/subtractor 14. The width of the pulse output from 34, which governs the number of pulses gated into or out of the $e1$ series of Fig. 3, is regulated by potentiometer 92, which therefore constitutes the "rate" adjustment of the instrument.

Sweep generator 22 is conventional and controlled by pulser 20, and controls the conventional horizontal deflection amplifier shown driving horizontal deflection plates 26 (compare Fig. 1). A portion of the output of sweep pulser 20 also passes via lead 30 to divider 46 (scale of two) to separate vertically the "tick" and "tock" traces. The same lead 30 proceeds through the manual brightness-control potentiometer 94 to the intensity control electrode 28 of cathode ray tube 24.

Microphone or vibration pickup 38 feeds a beat amplifier 96 supplying signal to vertical deflection amplifier 42 and thence to vertical deflection plates 44 (compare Fig. 1). Conventional astigmatism and focus controls for tube 24 are located at numerals 98 and 100.

A special feature of the circuit is in the use of a carrier system for blanking the trace of tube 24 between display intervals. Since the blanking rate is only of the order of five times per second, a heavily bypassed power supply would be needed to get satisfactory blanking by direct application of blanking pulses on grid or cathode of tube 24. To avoid this, tube 102 is used as a blanking modulator. It receives 99 kc. carrier energy from amplifier 52 over lead 104, and 330 cycle darkening pulses from tube 82 on its grid. Its plate voltage is positive only during the scan interval by virtue of the signal from pulser 20. The amplitude of this pulse is adjusted by the intensity control 94, and fed through resistor 106 to the plate of tube 102. Therefore, bursts of 99 kc. energy with 330-cycle "holes" appear on the plate of tube 102, the bursts being the width of the blanking and sweep pulse of pulser 20. Such a frequency is readily coupled by capacitor 108 to a rectifier 110 where it is rectified (demodulated) to a 5-cycle pulse which is applied between the grid 28 and cathode of tube 24.

In order to maintain the pulser 34 locked to the frequency of oscillator 10, a little of the 99 kc. output from the multivibrator 52 is fed over lead 112 to the pulser's last stage. This prevents slight "wandering" of the pulser output.

While the operation of sweep generator 22 is conventional, it is stated that the pulse received on its grid is negative, 40 milliseconds wide and recurs every 200 milliseconds (at 5 cycles). During the pulse, plate current in 22 ceases, and capacitor 114 charges towards +300 volts. When the pulse ends, plate current flow discharges capacitor 114 towards −105 volts. The voltage at the output is thus a sawtooth which returns to its base and stays for ⅘ of the time, rising linearly during the actual sweep interval.

Figure 6:
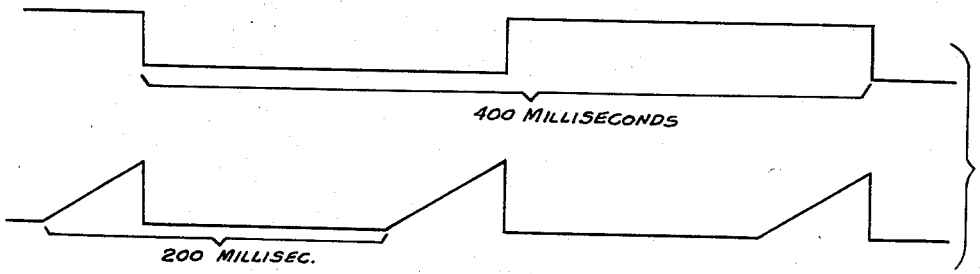
Fig. 6 is a further graphical representation of the sweep separation and scan waves showing their timing relationships.

Fig. 6 of the drawings shows the relationship of the beat separation pulse from divider 46 (to separate the tick and tock displays vertically from one another (to the sweep voltage wave. The way in which the separation of successive tick and tock traces occurs will be clear from this diagram.

While the description above considers a usual case in which only the action at or near the escapement period is displayed on scope 24, cases may arise in which the entire cycle should be investigated; for example, to detect conditions not arising from the escapement parts themselves. This can readily be done by setting the rate control 92 to produce a fairly rapid drift of the trace across the oscilloscope face; any portion may be stopped for inspection by resetting the rate control for zero drift when a desired part of the trace is in view. The same method permits escapement action to be centered rapidly on the screen when a watch is first put under observation.

*Alternate frequency varying system*

The system described above varies the effective master oscillator pulse frequency by omitting or adding various numbers of pulses. An alternative approach will now be described.

Figure 7:
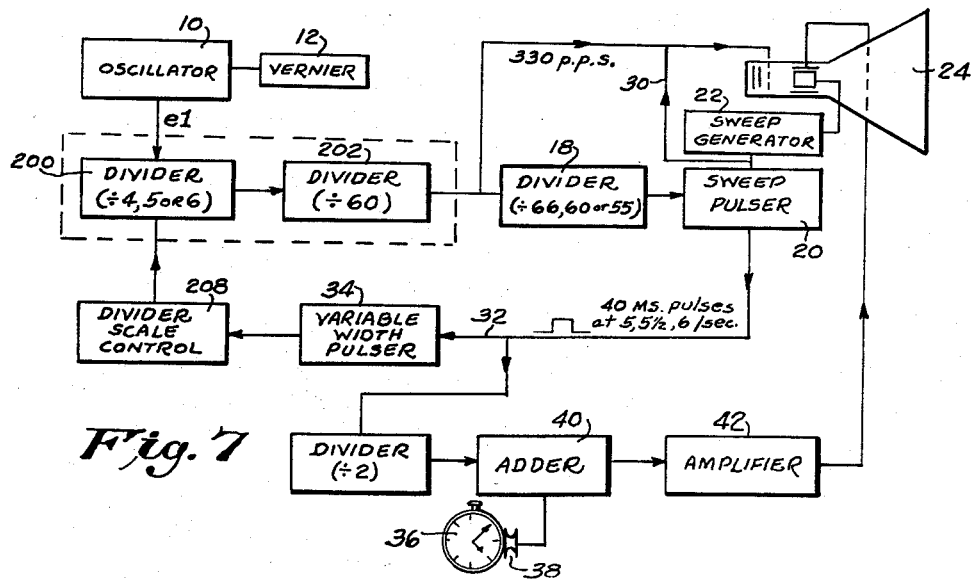
Fig. 7 is a block diagram of a modified form of narrow-range frequency adjusting system suitable for use with the invention.

Considering Fig. 5, the alteration in frequency is obtained by adding or subtracting one or more pulses to or from the series developed by multivibrator 52. Fig. 7 illustrates a modification in which the gates for adding or subtracting these pulses are omitted, and instead the frequency change is accomplished by momentarily altering the scale or counting factor of one of the frequency divider stages. The parts in Fig. 7 identical to those of the first embodiment bear the same legends and reference numerals as heretofore, and it will be noted that the pulse adder/subtractor is omitted. Assuming the oscillator 10 puts out pulses like the e1 series, or feeds a multivibrator for producing such an output, the 99 kc. pulses are directed to a divider chain including a variable scale divider 200 and a following fixed scale divider 202, the divider 200 being settable to divide by (say) either four or six under electronic control for a short period, after which it returns to the normal counting rate or dividing scale of five as in the case of the first divider stage of element 16 in Figs. 1 and 5. This can readily be accomplished merely by altering the firing level of the tube in this first counter stage. When the scale of division is five, the e5 pulse from variable width pulser 34 would have to be long enough to cover the first firing from the starting point, the possible error being no greater than one pulse of the 99 kc. e1 series. The e5 pulse from pulser 34 would have to increase 50.5 microseconds in length for each additional 99 kc. pulse to be added or dropped; that is, this is the length of time that the scale of counter 200 would have to be altered from five to four or from five to six to change the average rate an amount corresponding to one 99 kc. pulse per sweep cycle. Thus, for a change equivalent to 150 pulses of e1, the e5 pulse would need to be 7.575 milliseconds long. This e5 pulse should occur after completion of a display scan, since it would interfere with up to five of the calibration dots if it occurred during the display period.

Figure 8:
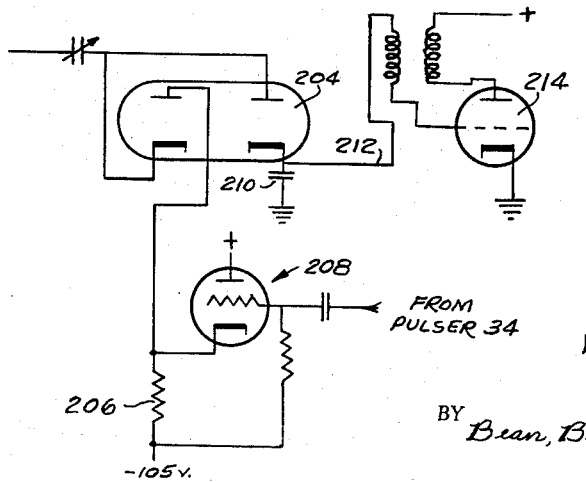
Fig. 8 is a schematic of circuit elements applicable to the Fig. 7 modification.

One way in which such an e5 pulse could be applied to the control of the counting scale of divider 200 is illustrated schematically in Fig. 8. Comparing this diagram with the corresponding portion near the beginning of the counter stage 16 of Fig. 5, it will be seen that the negative voltage applied to the plate of the first counter diode 204 is now received through a resistor 206 forming the cathode resistor of a cathode follower control tube 208. Since the counting rate or dividing factor depends upon the relationship between the voltage applied across the diodes to the capacitance of the storage capacitor 210, the application of a pulse from pulser 34 to the grid of control tube 208 will alter the counting rate so long as the control pulse is applied, and the direction of alteration will depend upon the polarity of the control pulse. The selection as between "slow" and "fast" is obtained by selecting the pulse polarity just as in the case of Figs. 1 and 5. The output pulses on lead 212 are carried to the usual blocking oscillator 214 associated with this type of step-by-step counter.

Other ways in which the counter scale could be altered under control of pulser 34 will be apparent to those familiar with frequency division circuitry. Thus, the amplitude of the pulses applied to the first counter stage diode 204 from oscillator 10 could be momentarily altered or modulated by the control pulse from 34, or additional capacitance could effectively be added to capacitor 210 or subtracted therefrom.

While the invention has been described in accordance with the patent statutes in connection with a preferred embodiment thereof, it is to be understood that modifications may be made by those skilled in the art without departing from the inventive principles. Also, while the apparatus has been described in connection with a watch or timepiece error measuring application, it will be obvious that it may equally well be applied to the measurement of any recurrent series of events which can be expressed in terms of a voltage such as the output voltage of the transducer or microphone 38. All such variations and modifications are considered a part of the invention insofar as they fall within the scope of the appended claims.

What is claimed is:

1. Precision timing apparatus for measuring and indicating the time relationships among time-spaced recurrent events, comprising means for generating a series of pulses occurring at a rate which is large compared to the recurrence frequency of said events, means for regulating the average rate of occurrence of said pulses through at least one value which is an integral multiple of said recurrence frequency, means for dividing the pulse series in frequency to provide a secondary pulse series having a rate equal to the recurrence frequency of said events, means responsive to the output of said dividing means for energizing said regulating means for an interval during each cycle of the output of said dividing means, adjustable control means for said responsive means having indicator means connected thereto to provide an indication of the setting of said adjustable control means, an oscilloscope, a time base sweep for said oscilloscope connected for control by said dividing means, means for deflecting the trace of said oscilloscope relative to its sweep axis in accordance with the successive recurrent events, and trigger means controlled by said dividing means for energizing said time base sweep substantially only during the intervals of recurrence of said events, whereby the display on said oscilloscope is substantially coextensive in time with the periods occupied by said events to the exclusion of the time intervals therebetween.

2. Apparatus in accordance with claim 1, in which said regulating means comprises means for periodically interspersing or deleting a selected number of pulses in said series, said indicator means being calibrated in terms of watch rate error to provide an indication of the number of pulses being interspersed or deleted.

3. Apparatus in accordance with claim 1, in which the means for regulating the recurrence rate of said pulses comprises a counter stage having an adjustable counting scale, said responsive means being responsive to the output of said dividing means for altering said counting scale for an interval during each cycle of the output of said dividing means.

4. Apparatus in accordance with claim 1, in which said regulating means is energized by the output of said dividing means only during intervals between successive energization of said time base sweep.

5. Apparatus in accordince with claim 1, including a scale-of-two frequency divider connected to the output of said dividing means, and an axis-shift combining circuit connected to the output of said divider and to said trace-deflecting means whereby to display successive of said events in separate positions on said oscilloscope.

6. Apparatus in accordance with claim 1, including means for periodically suppressing the trace of said oscilloscope at a frequency which is a sub-multiple of the recurrence frequency of said series of pulses, to provide time markers in said trace.

7. Apparatus in accordance with claim 1, including means for injecting a portion of the output of said means for generating the series of pulses into the circuit of said regulating means, whereby to stabilize the output phase of said regulating means with reference to said pulse series.

8. Apparatus in accordance with claim 2, in which said regulating means comprises means for deriving from said series of pulses a similar series delayed by one-half the pulse repetition interval, and a pair of gates arranged for alternative operation respectively (a) to delete a selected number of pulses from the original series to reduce the average rate of recurrence thereof, and (b) to intersperse among the pulses of said original series a selected number of the delayed pulses to increase the average rate of recurrence thereof.

9. Apparatus in accordance with claim 7, wherein said responsive means comprises a variable width pulse generator, and means for applying the output of said variable width pulse generator selectively to either of said gates to achieve increase or decrease in the average recurrence rate of the original pulse series.

10. Apparatus in accordance with claim 8, wherein said indicator means comprises manually adjustable means calibrated in terms of watch rate error for varying the width of the pulse produced by said variable width pulse generator, and including manually settable means for said regulating means calibrated in terms of slow and fast watch rate errors for applying the variable width pulse to the selected one of said gates.

11. Precision timing apparatus for measuring and indicating the time relationships among time-spaced recurrent events, comprising means for generating a series of pulses occurring at a rate which is large compared to the recurrence frequency of said events, means for regulating the average rate of occurrence of said pulses through at least one value which is an integral multiple of said recurrence frequency, means for dividing the pulse series in frequency to provide a secondary pulse series having a rate equal to the recurrence frequency of said events, means responsive to the output of said dividing means for energizing said regulating means for an interval during each cycle of the output of said dividing means, adjustable control means for said responsive means having indicator means connected thereto to provide an indication of the setting of said adjustable control means, an oscilloscope, a time base sweep for said oscilloscope connected for control by said dividing means, means for deflecting the trace of said oscilloscope relative to its sweep axis in accordance with the successive recurrent events, trigger means controlled by said dividing means for energizing said time base sweep substantially only during the intervals of recurrence of said events, whereby the display on said oscilloscope is substantially coextensive in time with the periods occupied by said events to the exclusion of the time intervals therebetween, and means for selectively altering the division ratio of said dividing means to accommodate gross differences in the recurrence interval of said recurrent events.

12. In a timepiece testing and timing device of the type having an oscilloscope indicator, a precision frequency source, a transducer for converting beats of said timepiece into an electrical signal, and circuits for applying voltages from said source and said transducer to respective deflecting means in said oscilloscope for displaying the beats of said timepiece against a calibrated time scale defined by said source, the improvement which comprises: selective means for altering the effective output frequency of said source in discrete steps to synchronize with the nominal beat frequencies of different timepieces, means for generating a square wave in synchronism with the effective output of said source and having a half wave period equal to the beat interval of the timepiece being tested, and adding means for combining the output of said generating means with the electrical signals from said transducer to apply the sum thereof to the oscilloscope deflecting means adapted to receive voltages from said transducer, whereby the displays for alternate beats of the timepiece are separated on the screen of said oscilloscope.

13. A device in accordance with claim 12, in which the frequency of said precision source is a multiple of the least common multiple of the frequencies corresponding to the discrete steps selectable by said selective means.

14. A device in accordance with claim 12, and including additional means for varying the effective output frequency of said precision source substantially continuously over a range of values less than the separation of said discrete steps.

References Cited in the file of this patent

UNITED STATES PATENTS

| | | |
|---|---|---|
| 2,121,359 | Luck et al. | Jan. 21, 1938 |
| 2,285,038 | Loughlin | June 2, 1942 |
| 2,317,202 | Kohlhagen | Apr. 20, 1943 |
| 2,535,304 | Lindborg | Dec. 26, 1950 |
| 2,648,027 | Geohegan | Aug. 4, 1953 |
| 2,677,783 | Wilson | May 4, 1954 |
| 2,760,108 | Wilson et al. | Aug. 21, 1956 |